UNITED STATES PATENT OFFICE.

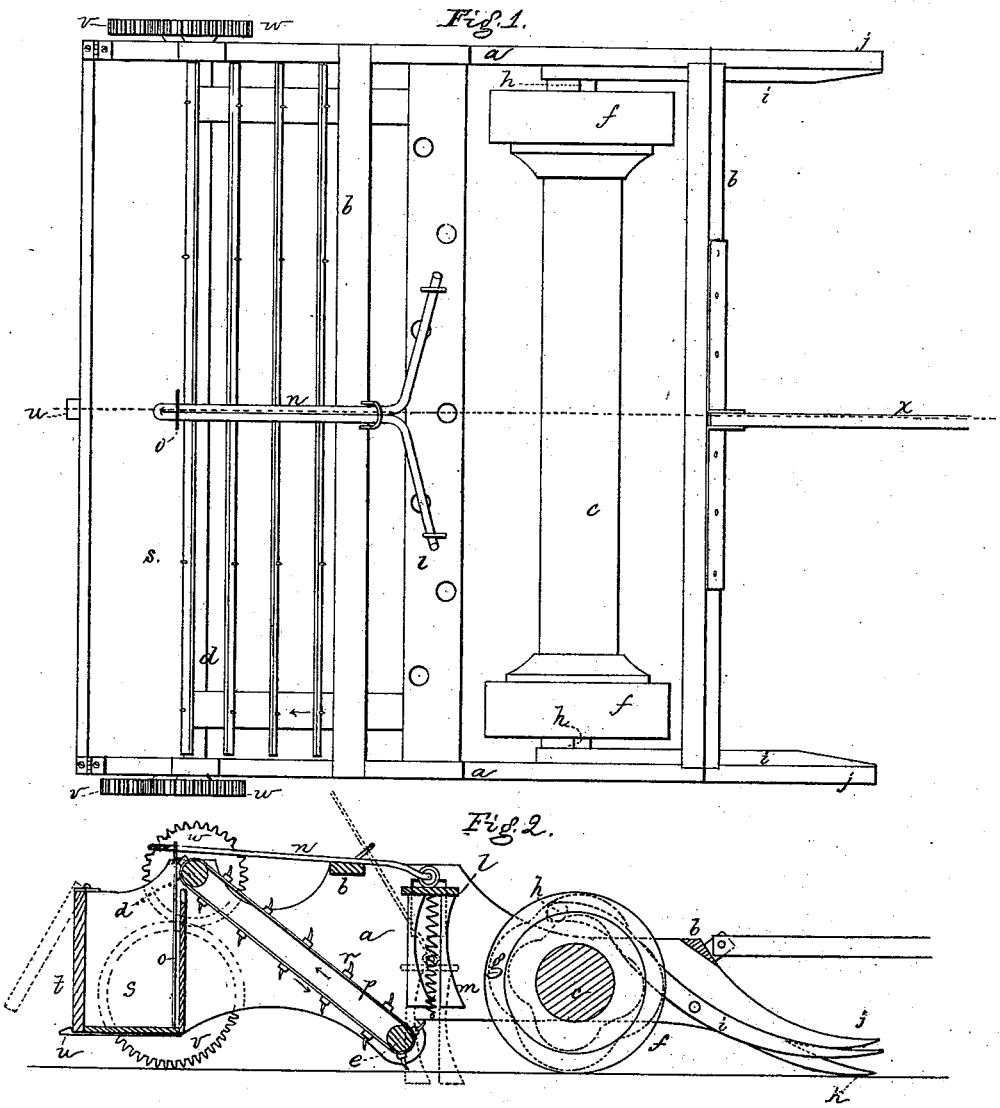

WILLIAM PIERCE, OF STONEHAM, MASSACHUSETTS.

IMPROVEMENT IN STRAWBERRY AND VEGETABLE CULTIVATORS.

Specification forming part of Letters Patent No. 190,247, dated May 1, 1877; application filed May 5, 1876.

To all whom it may concern:

Be it known that I, WILLIAM PIERCE, of Stoneham, in the county of Middlesex and State of Massachusetts, have invented an Improved Strawberry and Vegetable Cultivator, of which the following is a specification:

This invention relates to a machine for trimming the runners from between rows of strawberry-vines, and then cultivating or breaking up the soil between the rows; and the invention consists in the combination, with a vibrating blade to cut the vines, of a cultivator, as hereinafter set forth.

Figure 1 represents my improved cutter and cultivator, top view; and Fig. 2, a longitudinal section thereof.

The frame $a$ is connected by suitable cross-bars $b$, and supports the roller $c$ and shafts $d\,e$.

The roller will be preferably made of iron, and the wheels or disks $f$, suitably attached to the roller $c$, are provided with cam-grooves $g$, (shown in dotted lines,) adapted to receive pins $h$, projecting from the pivoted double-edged cutting-blade $i$, working in connection with the fingers $j\,k$, the latter running close to the ground, and passing under the runners extending out laterally from the regular rows of vines, the runners received between the fingers $j\,k$ being cut loose from the main row or rows of vines, and after the runners are severed from the main rows, then the soil between the rows may be cultivated or overturned without disturbing the main rows of vines.

The cultivator, in this instance, is shown as a bar, $l$, provided with cultivator-teeth or plows $m$, placed at proper distances apart, and adapted to be thrown down, as in dotted lines, when they enter the soil, or to be raised out of action, as shown in full lines, Fig. 2, when the plows are not to operate, and then the bar $l$ is held up by a lever, $n$, and catch $o$.

Back of the plows or teeth $m$ is placed an endless belt or carrier, $p$, having bars provided with teeth $r$, that engage the torn-up vines and weeds, and the belt, moving in the direction of the arrow, carries them into the box $s$, from which they are discharged, when desired, through the door $t$, held closed by a catch, $u$.

A wheel, $v$, engages a pinion, $w$, on shaft $d$, and the chain or belt $p$ will, in practice, engage sprockets on the shafts $d\,e$, to move them in unison.

The cultivator-teeth will be of any ordinary construction, and will be provided with any usual devices to regulate the distance to which they will project into the soil.

Instead of moving the cutting-blade by a grooved cam, I may vibrate it in any other well-known or suitable way; and when the cultivator is used alone, I may then throw the cutting-blade out of action by removing it, or in any other proper way.

The machine is drawn by means of the tongue $x$.

I claim—

1. The stationary and vibrating blades and cam-grooved roller, in combination with the belt to pick up, and the box to contain, the vines severed from the row, substantially as described.

2. In combination, the vibrating vine-cutting blades, the cultivator, the toothed belt, and the box or receptacle $s$ to contain the vines, substantially as described.

In testimony whereof I have signed my name to this specification in the presence of two subscribing witnesses.

WILLIAM PIERCE.

Witnesses:
G. W. GREGORY,
W. J. PRATT.